(12) United States Patent
Hassan et al.

(10) Patent No.: US 10,313,406 B2
(45) Date of Patent: Jun. 4, 2019

(54) SYNTHETIC TRANSACTION TO DETERMINE CENTROID FOR CLOUD HOSTING

(71) Applicant: Microsoft Technology Licensing, LLC, Redmond, WA (US)

(72) Inventors: Amer Hassan, Kirkland, WA (US); Bradford R. Clark, Broomfield, CO (US); Gareth Lyndon Eadred Bridges, Redmond, WA (US); Russell Andrew Penar, Highlands Ranch, CO (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 179 days.

(21) Appl. No.: 15/340,257

(22) Filed: Nov. 1, 2016

(65) Prior Publication Data
US 2018/0124130 A1   May 3, 2018

(51) Int. Cl.
| G06F 15/173 | (2006.01) |
| H04L 29/06 | (2006.01) |
| H04L 12/26 | (2006.01) |
| G06F 9/44 | (2018.01) |
| G06F 15/16 | (2006.01) |

(52) U.S. Cl.
CPC .......... *H04L 65/403* (2013.01); *H04L 43/08* (2013.01); *H04L 65/1069* (2013.01); *H04L 65/80* (2013.01)

(58) Field of Classification Search
USPC ....... 709/204, 224, 203, 223, 228, 227, 229, 709/238, 239
See application file for complete search history.

(56) References Cited

U.S. PATENT DOCUMENTS

| 6,091,802 A * | 7/2000 | Smith ................... H04M 3/323 379/1.03 |
| 6,763,321 B2 | 7/2004 | Gross et al. |
| 7,822,837 B1 * | 10/2010 | Urban ................. H04L 41/5009 709/223 |
| 7,843,843 B1 * | 11/2010 | Papp, III ............. H04L 41/5009 370/252 |
| 8,051,163 B2 | 11/2011 | Ruiz et al. |
| 8,326,971 B2 | 12/2012 | Dickerson et al. |
| 8,656,006 B2 | 2/2014 | Cobb et al. |

(Continued)

OTHER PUBLICATIONS

Horovitz, Yair, "Using synthetic transactions to monitor critical application business flows", Retrieved on: Sep. 2, 2016 Available at: https://community.hpe.com/t5/IT-Operations-Management-ITOM/Using-synthetic-transactions-to-monitor-critical-application/ba-p/6062883#.V8_xqfl95Q.

*Primary Examiner* — Jude Jean Gilles

(57) ABSTRACT

One or more data centers are selected to host an online conference. The selection of the data center is based on a set of metrics that are measured from 'synthetic' transactions. These synthetic transactions are sent between candidate data centers and the participants in the conference call in order to measure one or more performance metrics (e.g., link quality metrics such as delay, packet loss, etc.) These measured performance metrics are used to determine a centroid that represents the geometric center or 'center of mass,' of the link quality between participants and data centers. This 'link quality centroid' is used to select a subset of data centers as candidate data centers. The candidate data center with the best average performance metric(s) is selected as the data center to host the conference.

20 Claims, 8 Drawing Sheets

(56) References Cited

U.S. PATENT DOCUMENTS

| | | | |
|---|---|---|---|
| 9,300,565 B2 | 3/2016 | Robitaille et al. | |
| 2005/0114494 A1* | 5/2005 | Beck | G06F 9/542 709/224 |
| 2006/0277080 A1* | 12/2006 | DeMartine | G06Q 10/04 705/7.36 |
| 2007/0150568 A1 | 6/2007 | Ruiz | |
| 2008/0220873 A1 | 9/2008 | Lee et al. | |
| 2012/0023487 A1* | 1/2012 | Letca | G06F 11/3466 717/130 |
| 2012/0254414 A1* | 10/2012 | Scarpelli | G06F 11/3495 709/224 |
| 2014/0019212 A1* | 1/2014 | Lieblich | G06F 9/5027 705/7.36 |
| 2014/0051383 A1* | 2/2014 | Doerr | H04W 4/16 455/405 |
| 2014/0226799 A1* | 8/2014 | Aggarwal | H04M 3/2227 379/32.01 |
| 2014/0226800 A1 | 8/2014 | Aggarwal et al. | |
| 2014/0344169 A1* | 11/2014 | Phelps | G06Q 30/016 705/304 |
| 2015/0234731 A1* | 8/2015 | Williams | G06F 11/3684 717/126 |
| 2016/0028854 A1 | 1/2016 | Leeb et al. | |
| 2016/0150425 A1 | 5/2016 | Kuru | |
| 2016/0294655 A1* | 10/2016 | Lin | H04L 43/0882 |

\* cited by examiner

SEND, BETWEEN A PLURALITY OF PARTICIPANTS AND A PLURALITY OF DATA CENTERS, SYNTHETIC TRANSACTIONS TO MEASURE A PERFORMANCE METRIC ASSOCIATED WITH TRANSMISSIONS BETWEEN EACH OF THE PLURALITY OF PARTICIPANTS AND EACH OF THE DATA CENTERS
202

BASED ON THE MEASURED PERFORMANCE METRICS, SELECT AN INITIAL DATA CENTER TO HOST A CONFERENCE CALL HAVING PARTICIPANTS ON THE CONFERENCE CALL THAT INCLUDE THE PLURALITY OF PARTICIPANTS
204

INITIATE THE CONFERENCE CALL USING THE INITIAL DATA CENTER TO HOST THE CONFERENCE CALL
206

FIGURE 2

US 10,313,406 B2

SYNTHETIC TRANSACTION TO DETERMINE CENTROID FOR CLOUD HOSTING

BACKGROUND

Online conferencing (a.k.a., web conferencing and/or internet conferencing) systems have an array of capabilities including voice/video communications, instant messaging, data/application sharing, and white-boarding. These online collaborative service systems enable users to engage in communication sessions to exchange different types of communication media, such as voice data, video data, content sharing, and combinations thereof. Some conferencing systems enable users to share and collaborate in creating and modifying documents or other shared content. Online conferencing typically allows real-time point-to-point communication as well as multicast communications (i.e., from one sender to many receivers.) Some services offer data streams of voice and/or video chat to be shared simultaneously, across geographically dispersed locations. Applications for online conferencing include meetings, training events, lectures, and presentations.

SUMMARY

Examples discussed herein relate to a method of selecting a data center to host a conference call. The method includes sending, between a first plurality of participants and a plurality of data centers, synthetic transactions to measure at least one performance metric associated with transmissions between each of the first plurality of participants and each of the plurality of data centers. The method also includes selecting, based on the at least one performance metric associated with transmissions between each of the first plurality of participants and each of the plurality of data centers, an initial data center to host a conference call having participants on the conference call that include the first plurality of participants.

In another example, a communication system includes an initial data center of a plurality of data centers to initially host a conference call having participants on the conference call that include a first plurality of participants. The selection of the initial data center is based at least in part on performance metrics associated with synthetic transmissions between each of the first plurality of participants and each of a first plurality of data centers of the plurality of data centers. The communication system also includes a handoff system to select an identified data center from a second plurality of data centers of the plurality of data centers. This selection is based at least in part on performance metrics associated with synthetic transmissions between each of the first plurality of participants and the identified data center. Once selected, the identified data center is to host the conference call.

In another example, a plurality of data centers are configured to send, between a first plurality of participants and the plurality of data centers, synthetic transactions to measure at least one performance metric associated with transmissions between each of the first plurality of participants and each of the plurality of data centers. Based on the at least one performance metric associated with transmissions between each of the first plurality of participants and each of the plurality of data centers, an initial data center is selected to host a conference call having participants on the conference call that include the first plurality of participants.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

In order to describe the manner in which the above-recited and other advantages and features can be obtained, a more particular description is set forth and will be rendered by reference to specific examples thereof which are illustrated in the appended drawings. Understanding that these drawings depict only typical examples and are not therefore to be considered to be limiting of its scope, implementations will be described and explained with additional specificity and detail through the use of the accompanying drawings.

FIG. 2 is a flowchart of a method of selecting a data center to host an online conference.

DETAILED DESCRIPTION OF THE EMBODIMENTS

Examples are discussed in detail below. While specific implementations are discussed, it should be understood that this is done for illustration purposes only. A person skilled in the relevant art will recognize that other components and configurations may be used without parting from the spirit and scope of the subject matter of this disclosure. The implementations may be a machine-implemented method, a computing device, or a computer readable medium.

Before or during an online conference, either due to network conditions or changes to the participants on the call, there may be a better data center (e.g., faster, better quality, more efficient) than the currently selected data center to host the call. In an embodiment, one or more data centers are selected to host the online conference. The selection of the data center is based on a set of metrics that are measured from 'synthetic' transactions. These synthetic transactions are sent between candidate data centers and the participants in the conference call in order to measure one or more performance metrics (e.g., link quality metrics such as delay, packet loss, etc.) These measured performance metrics are used to determine a centroid that represents the geometric center or 'center of mass,' of the link quality between participants and data centers. This 'link quality centroid' is used to select a subset of data centers as candidate data centers. The candidate data center with the best average performance metric(s) is selected as the data center to host the conference. In some embodiments, a synthetic transaction may be an operation that is artificially executed in an application with the purpose of measuring specific network characteristics, such as delay, packet error rates, jitter, and the like.

It should be understood that in the following discussion of the various embodiments, the term 'conference call' is used for convenience. The term 'conference call' includes any type of media hosting such as Skype for Business, PSTN conferencing, webcasts, mobile device conferencing, internet radio, etc.

Figure 1A:
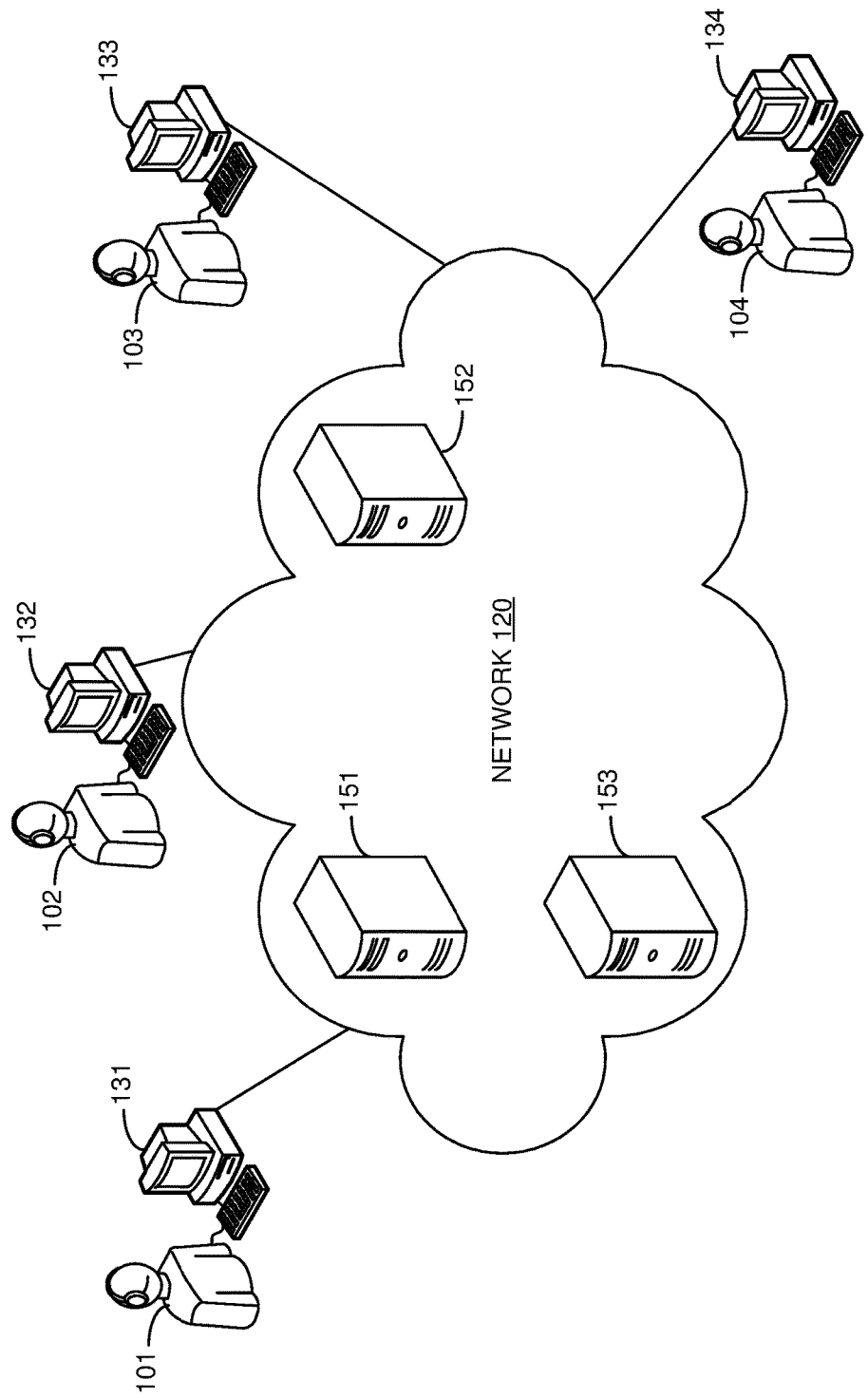
FIG. 1A is a block diagram illustrating an online conferencing system.

FIG. 1A is a block diagram illustrating an online conferencing system. In FIG. 1A, conferencing system 100 comprises participants 101-104, client devices 131-134, network 120, and data centers 151-153. Participants 101-104 use a software program deployed on client devices 131-134, respectively, to participate in an online conference hosted by a selected one of data centers 151-153. Client devices 131-134 are operatively coupled to network 120. Network 120 includes, or is operatively coupled to, data centers 151-153. Thus, participants 101-104, via client devices 131-134, network 120, and a selected data center 151-153 are able to join, leave, receive, and participate in, an online conference call.

Network 120 is a wide area communication network that can provide wired and/or wireless communication with data centers 151-153 by client devices 131-134. Network 120 and can comprise wired and/or wireless communication networks that include processing nodes, routers, gateways, physical and/or wireless data links for carrying data among various network elements, including combinations thereof, and can include a local area network, a wide area network, and an internetwork (including the Internet). Network 120 can also comprise wireless networks, including base station, wireless communication nodes, telephony switches, internet routers, network gateways, computer systems, communication links, or some other type of communication equipment, and combinations thereof. Wired network protocols that may be utilized by network 120 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Links between elements of network 120, can be, for example, twisted pair cable, coaxial cable or fiber optic cable, or combinations thereof.

Other network elements may be present in network 120 to facilitate communication but are omitted for clarity, such as base stations, base station controllers, gateways, mobile switching centers, dispatch application processors, and location registers such as a home location register or visitor location register. Furthermore, other network elements may be present to facilitate communication between among elements of conferencing system 100 which are omitted for clarity, including additional computing devices, client devices, access nodes, routers, gateways, and physical and/or wireless data links for carrying data among the various network elements.

Client devices 131-134 may be, for example, a desktop computer, a tablet computer, a laptop computer, a mobile phone, a wireless phone, a personal digital assistant (PDA), a voice over internet protocol (VoIP) phone, a voice over packet (VOP) phone, or a soft phone, as well as other types of devices or systems that execute a web browser and/or conferencing software (for example, the Skype™ app from Microsoft) in order to participate in a conference hosted by a data center 151-153. Other types of communication platforms are possible. An example device that may be, comprise, and/or include a client device 131-134 include, but are not limited to, example computer system 500 (described herein with reference to FIG. 5).

In an embodiment, conferencing system 100 selects from among data centers 151-153 an initial data center to host a conference call. This selection may be made by one or more of data centers 151-153, an element of data centers 151-153, or another system not shown in FIG. 1 (e.g., a data center selection and/or handoff system residing at and/or coupled to a data center 151-153.) This selection is based at least in part on the link quality of the connections between data centers 151-153 and client devices 131-134.

Before the conference call begins, data centers 151-153 are selected as initial data center candidates. In an embodiment, the selection of data centers 151-153 as initial data center candidates is based on the locations of participants 101-104 and data centers 151-153. In particular, data centers 151-153 may be selected as initial data center candidates based on the locations of data centers 151-153 being within a convex hull (a.k.a. convex envelope) computed from the locations of participants 101-104.

After a request to host a conference (or other media hosting), each of the initial candidate data centers 151-153 performs synthetic transactions to each client device 131-134 that is scheduled to be on the conference. These synthetic transactions are used to measure and/or calculate performance metrics associated with the connections between each respective initial data center candidate 151-153 and each client device 131-134. These performance metrics may measure or calculate, for example, the delay and/or packet error rates (or other link quality metrics).

The synthetic transactions that are sent may include, for example, Internet Control Message Protocol (ICMP) echo request and reply messages (a.k.a., 'ping' packets). The synthetic transactions that are sent may include, for example, the same types of messages that will be sent during the conference. The synthetic transactions that are sent may include, for example, predetermined or artificially generated content (e.g., media packets) that is carried via network 120 by the same types of messages that will be sent during the conference.

Based on the performance metrics associated with the connections between each respective initial data center candidate 151-153 and each client device 131-134, a centroid for client devices 131-134 may be calculated. Based on this centroid, a smaller set of candidate data centers are selected and prioritized. The centroid for client devices 131-134 may be determined by using the performance metrics to represent distances, locations, and/or weighting factors.

Shortly before the conference is to begin (e.g., 3 minutes), another set of synthetic transactions is sent between the smaller set of candidate data centers 151-152 and each client device 131-134. This second set of synthetic transactions is used to select, from the smaller set of candidate data centers 151-152, a data center 151-152 to host the conference.

In an embodiment, if, during the conference, an overall measure of quality changes (e.g., is degraded), conference system 100 may repeat the sending of synthetic transactions (and associated performance metric based calculations) to select a different data center from the smaller set of candidate data centers 151-152, a data center 151-152 to host the conference. In an embodiment, if, during the conference, an overall measure of quality changes (e.g., is degraded), conference system 100 may repeat the sending of synthetic transactions (and associated performance metric based calculations) to select a different smaller set of data centers as candidate data centers. After selecting a different smaller set of data centers as candidate data centers from the initial set of candidate data centers 151-153, synthetic transactions may be sent to select a new data center 151-153 from the new smaller set of candidate data centers 151-153 to host the conference.

Figure 1B:
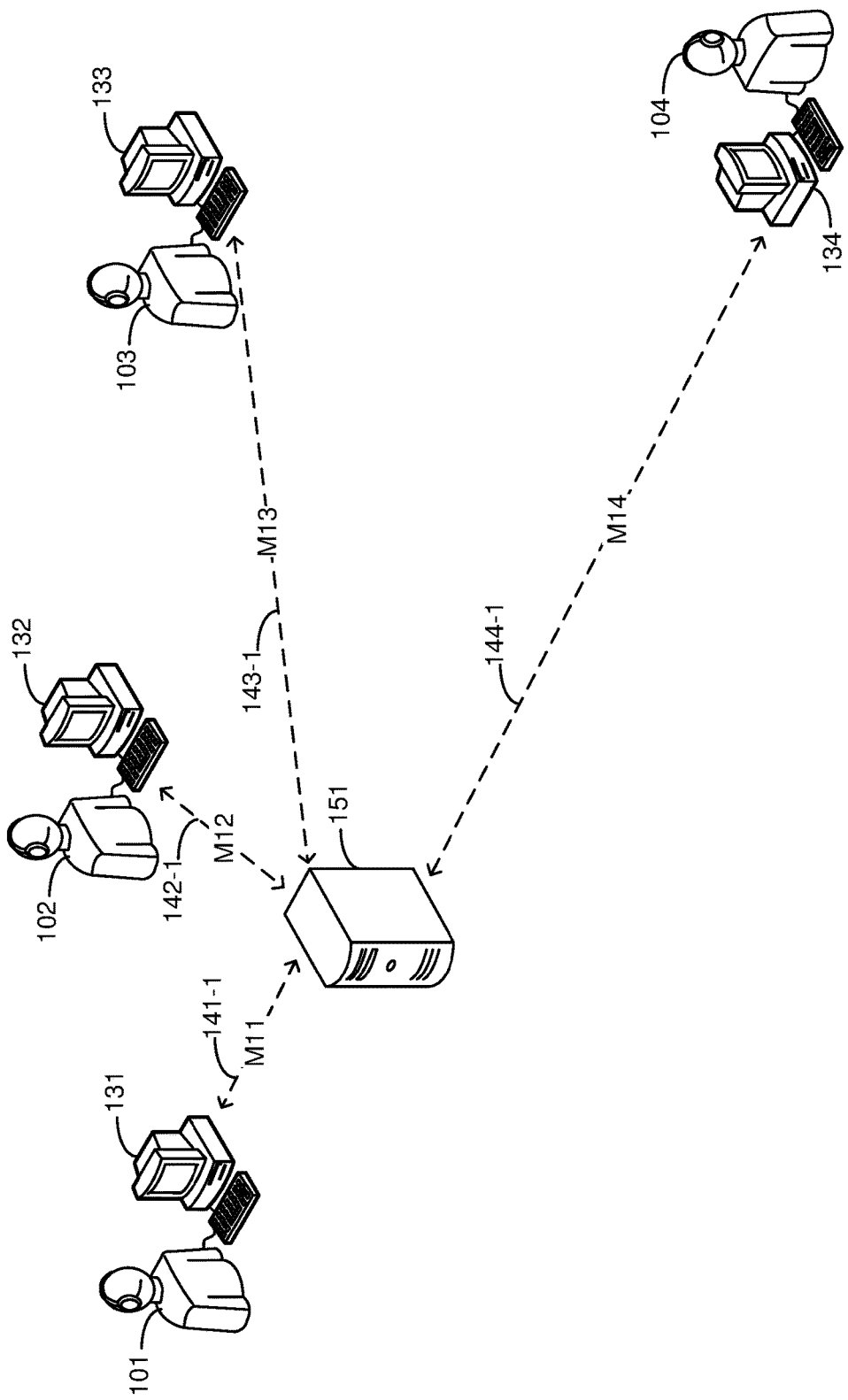
FIG. 1B is an illustration of measuring metrics using synthetic transactions between a data center.

FIG. 1B is an illustration of measuring metrics using synthetic transactions between a data center. FIG. 1B illustrates conferencing system 100. For clarity purposes, network 120 is not illustrated in FIG. 1B (though it should be understood that, as illustrated in FIG. 1A, network 120 is still part of conferencing system 100.)

In FIG. 1B, synthetic transactions being sent between data center 151 and client devices 131-134 are illustrated by arrows 141-1, 142-1, 143-1, and 144-1, respectively. The synthetic transactions sent between data center 151 and client devices 131-134 are used to measure and/or calculate performance metrics M11, M12, M13, and M14, respectively. Thus, arrow 141-1 runs between data center 151 and client device 131 and is labeled with the performance metric M11. Arrow 142-1 runs between data center 151 and client device 132 and is labeled with the performance metric M12. Arrow 143-1 runs between data center 151 and client device 133 and is labeled with the performance metric M13. Arrow 144-1 runs between data center 151 and client device 134 and is labeled with the performance metric M14.

Figure 1C:
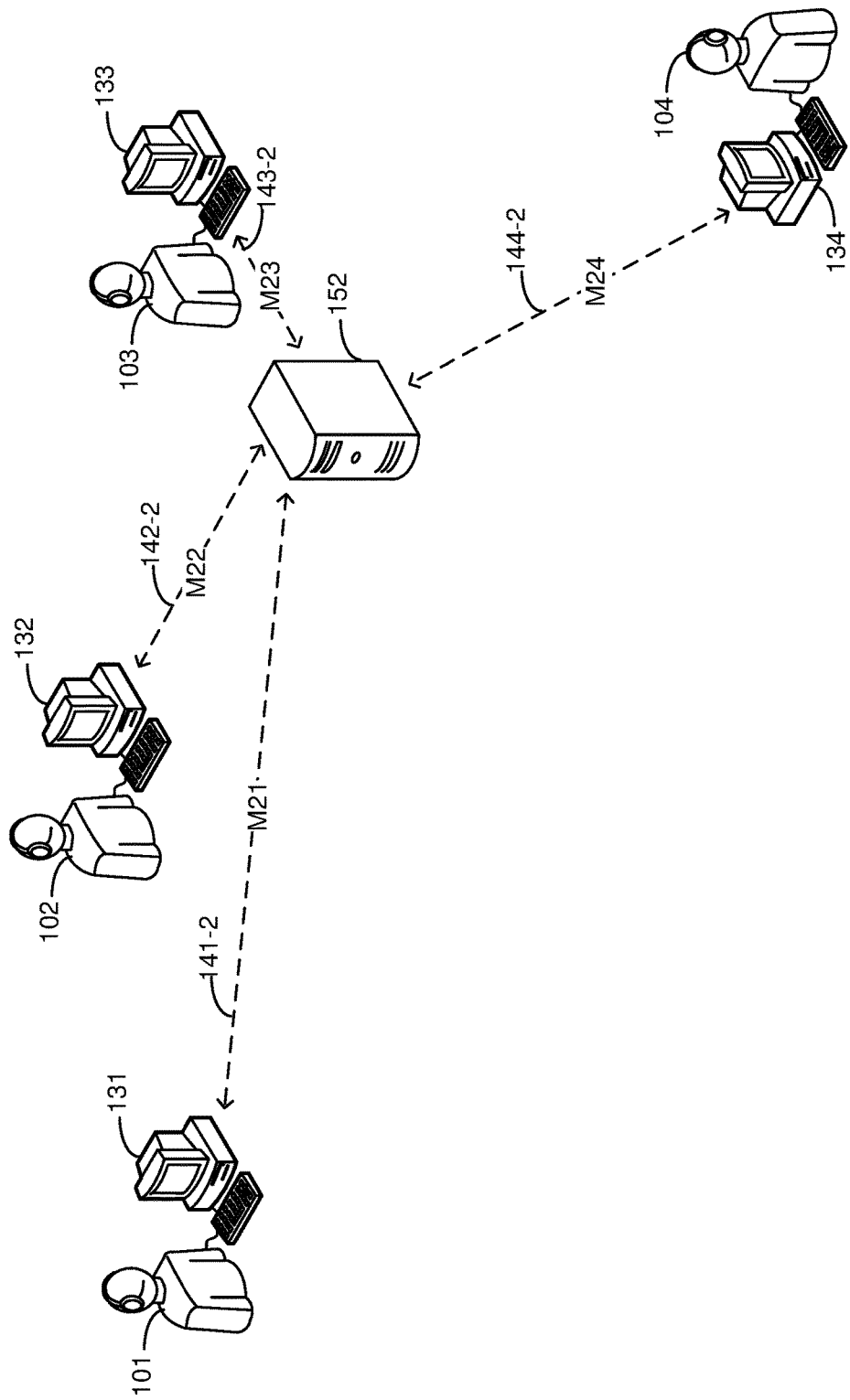
FIG. 1C is an illustration of measuring metrics using synthetic transactions between a different data center.

FIG. 1C is an illustration of measuring metrics using synthetic transactions between a different data center. FIG. 1C illustrates conferencing system 100. For clarity purposes, network 120 is not illustrated in FIG. 1C (though it should be understood that, as illustrated in FIG. 1A, network 120 is still part of conferencing system 100.)

In FIG. 1C, synthetic transactions being sent between data center 152 and client devices 131-134 are illustrated by arrows 141-2, 142-2, 143-2, and 144-2, respectively. The synthetic transactions sent between data center 152 and client devices 131-134 are used to measure and/or calculate performance metrics M21, M22, M23, and M24, respectively. Thus, arrow 141-2 runs between data center 152 and client device 131 and is labeled with the performance metric M21. Arrow 142-2 runs between data center 152 and client device 132 and is labeled with the performance metric M22. Arrow 143-2 runs between data center 152 and client device 133 and is labeled with the performance metric M23. Arrow 144-2 runs between data center 152 and client device 134 and is labeled with the performance metric M24.

Figure 1D:
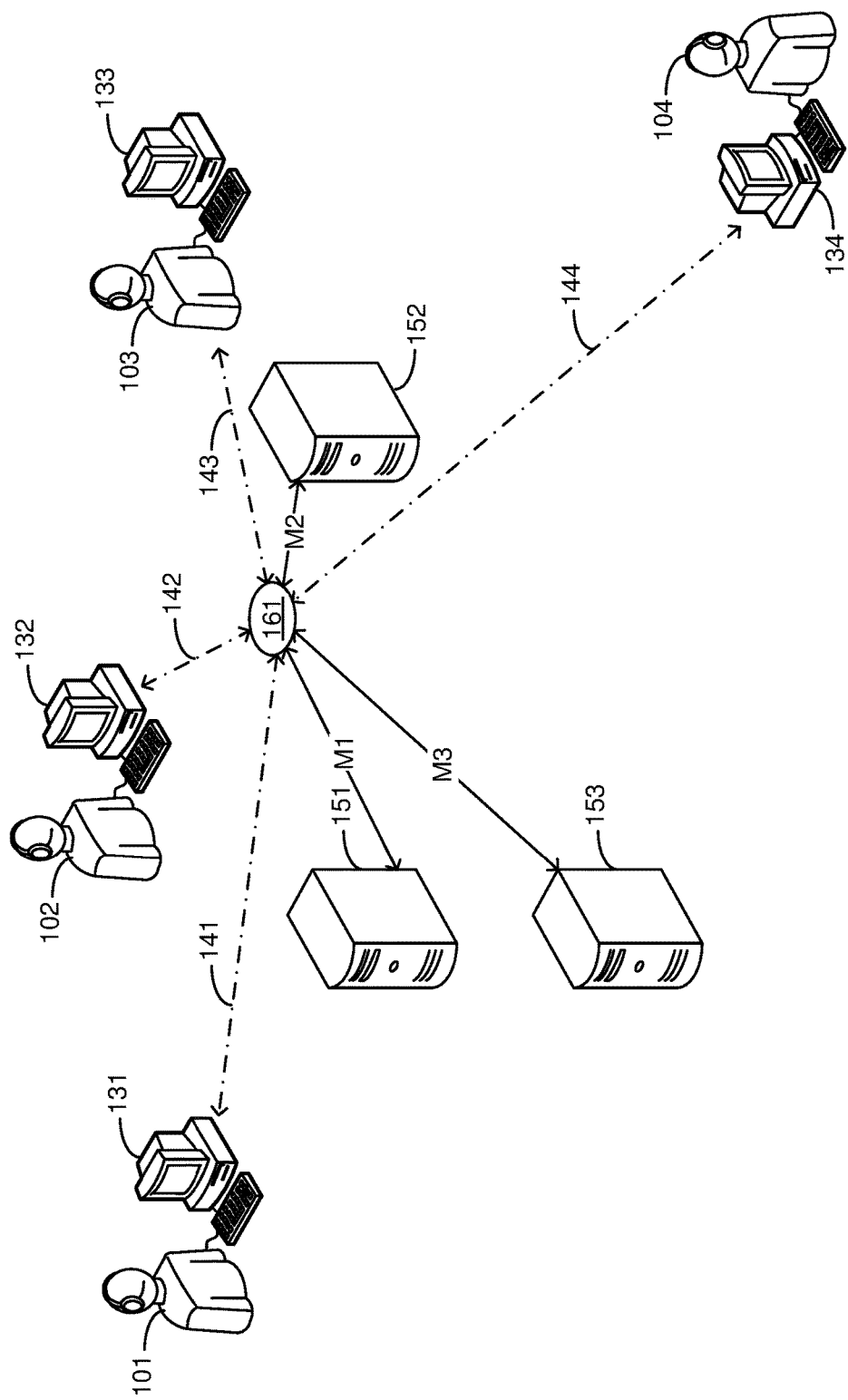
FIG. 1D is an illustration of a synthetic transaction based centroid of an online conference.

FIG. 1D is an illustration of a synthetic transaction based centroid of an online conference. FIG. 1D illustrates conferencing system 100. For clarity purposes, network 120 is not illustrated in FIG. 1D (though it should be understood that, as illustrated in FIG. 1A, network 120 is still part of conferencing system 100.)

In FIG. 1D, the performance metric centroid 161 of client devices 131-134 is illustrated. Performance metric centroid 161 is a weighted average of performance metrics M11, M12, M13, M14, M21, M22, M23, and M24.

The contribution of performance metrics M11, M12, M13, M14, M21, M22, M23, and M24 to the location of performance metric centroid 161 is illustrated in FIG. 1D by arrows 141-144. As described with reference to FIG. 1A, once a performance metric centroid 161 of the participants is calculated, a smaller subset of candidate data centers (e.g., data centers 151 and 152) is selected and prioritized. The smaller subset can be selected and prioritized based on comparing the performance metrics associated with the connections between each candidate data center 151-153 and performance metric centroid 161.

An arbitrary number (e.g., M) of data centers are selected for the smaller subset based on this comparison. In other words, for example, data centers 151 and 152 may be selected for the smaller set of candidate data centers based on the centroids of the performance metrics associated with the connections between respective data center 151 and 152 and client devices 131-134 being closer to the performance metric centroid 161 than the centroid of the performance metrics associated with the connection between data center 153 and client devices 131-134. This is illustrated in FIG. 1B by the length of arrows M1 and M2 (running between performance metric centroid 161 data centers 151-152, respectively) and the length of arrow M3.

This process may be repeated shortly before the conference begins to select the data center to host the conference. In other words, after conference system 100 re-measures at least performance metrics M11, M12, M13, M14, M21, M22, M23, and M24, conference system 100 may select data center 152 to host the conference based on comparing the performance metrics (M2) associated with data center 152 being closer to performance metric centroid 161 than the connections between the other candidate data center(s) 151 and performance metric centroid 161.

FIG. 2 is a flowchart of a method of selecting a data center to host an online conference. The steps illustrated in FIG. 2 may be performed by one or more elements of conference system 100. Between a plurality of participants and a plurality of data centers, synthetic transaction are sent to measure a performance metric associated with transmissions between each of the plurality of participants and each of the data centers (202). For example, data centers 151-153 may each exchange, each client device 131-134 that is scheduled or otherwise anticipated to be on the conference, one or more synthetic transactions. In an example, this exchange of synthetic transactions can be performed shortly after the conference is setup. In another example, this exchange of synthetic transactions can be performed shortly before (e.g., 1 to 10 minutes) the conference is scheduled to begin.

These synthetic transactions may be used by conference system 100 to measure and/or calculate performance metrics associated with the link (e.g., via the network 120) between each respective data center 151-153 and each client device 131-134. These performance metrics may measure or calculate, for example, the delay and/or packet error rates (or other link quality metrics).

The synthetic transactions that are exchanged may include, for example, ICMP echo request and reply messages and responses. The synthetic transactions that are exchanged may include, for example, messages of similar type (e.g., real-time protocol—RTP—packets, HTTP packets, etc.), size, and content that will be sent during the conference. The synthetic transactions that are sent may include, for example, predetermined (e.g., prerecorded test data) or artificially generated and/or arbitrary content that is carried by the same types of messages that will be sent during the conference.

Based on the measured performance metrics, an initial data center to host a conference call having participants on the conference call that include the plurality of participants is selected (204). For example, conference system 100 may select data center 152 to host the conference based on the performance metrics measured or calculated from the synthetic transactions between data centers 151-153 and/or client devices 131-134. The conference call is initiated using the initial data center to host the conference call (206). For example, data center 152, being the selected initial data center, may initiate the conference call having the plurality of participants (or at least as subset of the plurality of anticipated or scheduled participants that actually join the conference.)

Figure 3:
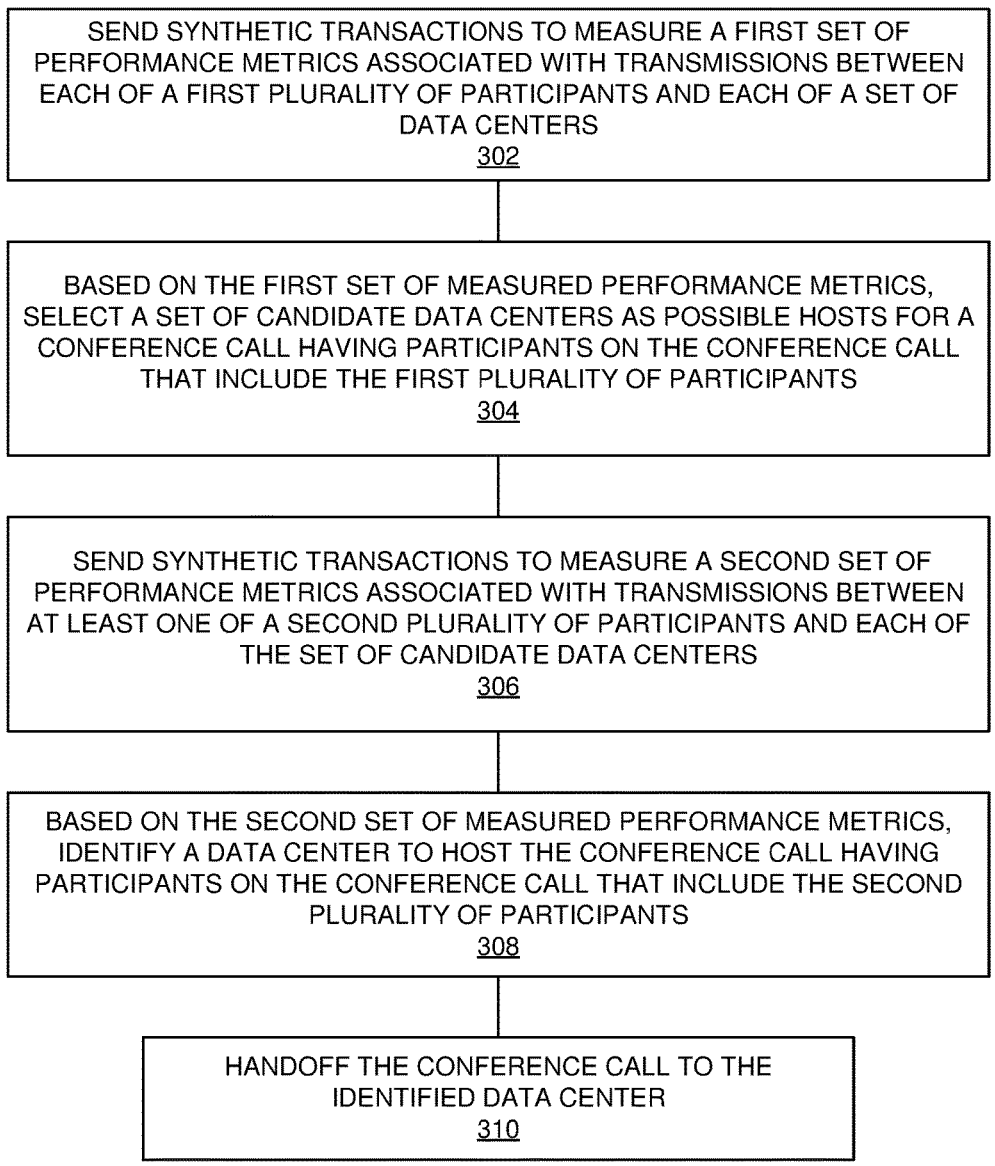
FIG. 3 is a flowchart illustrating a method of using synthetic transactions to select a data center when participants on an online conference change.

FIG. 3 is a flowchart illustrating a method of using synthetic transactions to select a data center when participants on an online conference change. The steps illustrated in FIG. 3 may be performed by one or more elements of conference system 100. Synthetic transaction are sent to measure a first set of performance metrics associated with transmissions between each of a first plurality of participant and each of a set of data centers (302). For example, when a conference is setup and/or shortly before a conference is scheduled to begin, data centers 151-153 and/or client devices 131-134 may send or exchange synthetic transactions to measure (and/or calculate from measurements) a set of one or more link performance and/or link quality metrics—such as one-way or round-trip delay, packet loss, jitter, error rate, throughput, etc. The data centers 151-153 and/or client devices 131-134 selected to send or exchange synthetic transactions may be based on a list of anticipated (e.g., scheduled) participants and/or their geographical locations.

Based on the first set of measured performance metrics, a set of candidate data centers is selected as possible hosts for a conference call having participants on the conference call that include the first plurality of participants (304). For example, based on the synthetic transaction based measurements/calculations, data center 151 and data center 152 may be selected as candidates to host the conference call. Data center 151 and data center 152 may be selected as candidates to host the conference call because data centers 151-152 are closest to a centroid of all the users, where the centroid and respective data center 151-153's proximity to that centroid is determined using the synthetic transaction based measurements/calculations.

Synthetic transactions are sent to measure a second set of performance metrics associated with transmissions between at least one of a second plurality of participants and each of the set of candidate data centers (306). For example, shortly before a conference is scheduled to begin, or during a conference, each of candidate data centers 151-152 and/or client devices 131-134 may send or exchange synthetic transactions to measure (and/or calculate from measurements) a set of one or more link performance and/or link quality metrics. In an example, the first plurality of participants (e.g., client device 131-134) is the same as the second plurality of participants. In another example, the first plurality of participants (e.g., client device 131-134) is different from the second plurality of participants—such as when a participant (e.g., client device 134) leaves, joins late, rejoins, or never joins the conference.

Based on the second set of measured performance metrics, a data center is identified to host the conference call having participants on the conference call that include the second plurality of participants (308). For example, based on the synthetic transaction based measurements/calculations between candidate data centers 151-152 and client devices 131-133, data center 152 may be selected to host the conference call. Data center 152 may be selected to host the conference call because data center 152 has the best performance metric(s) between itself and client devices 131-133 as determined using the synthetic transaction based measurements/calculations.

The call is handed-off to the identified data center (310). For example, identified data center 152 may be used to initially host the conference. In another example, if the conference is already being hosted by a different data center (e.g., data center 151), the conference may be handed-off to data center 152 based on the identification of data center 152 as the data center with the best performance metric(s) between itself and client devices 131-133 as determined using the synthetic transaction based measurements/calculations.

Figure 4:
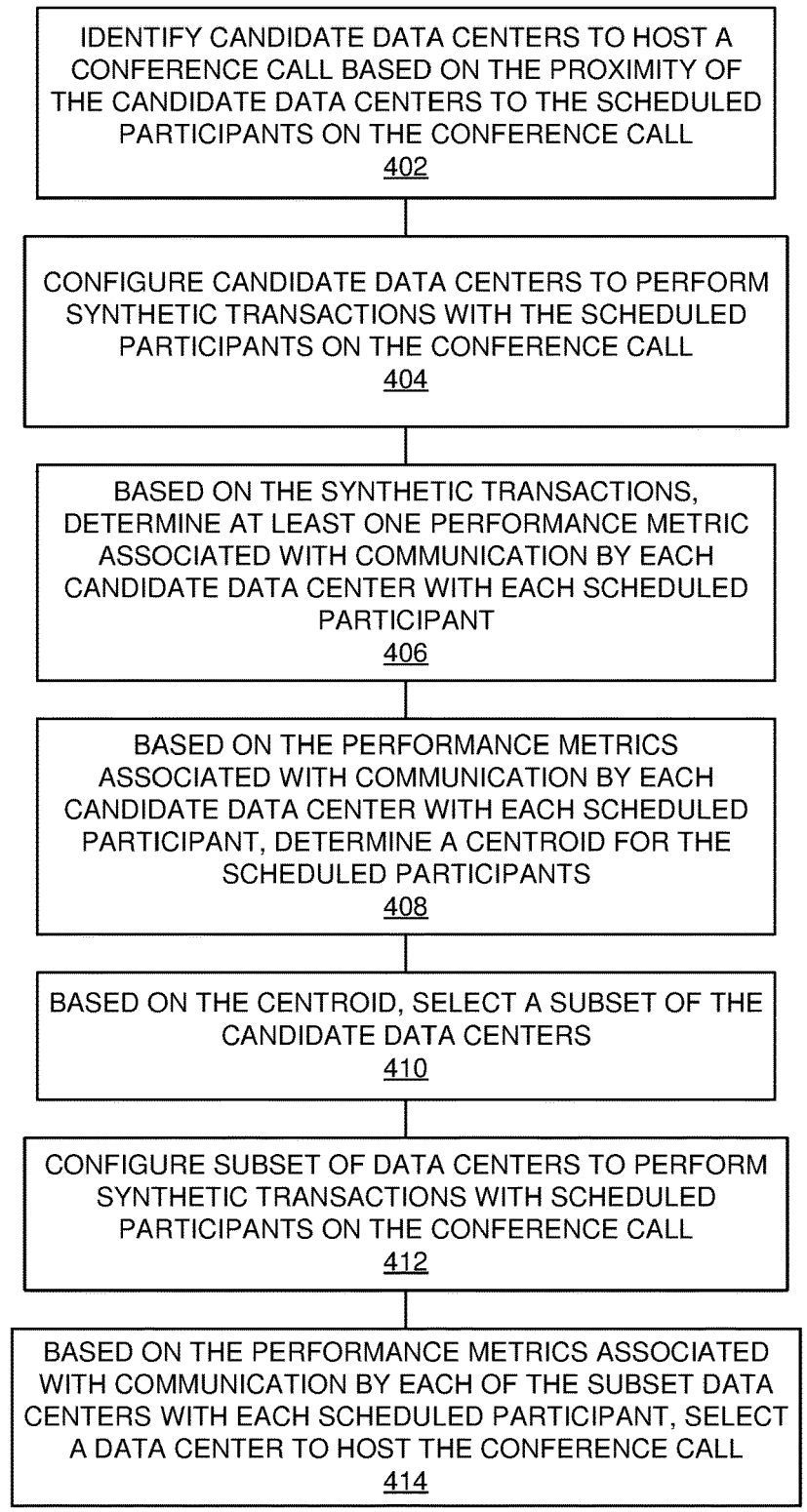
FIG. 4 is a flowchart illustrating a method of selecting candidate data centers.

FIG. 4 is a flowchart illustrating a method of selecting candidate data centers. The steps illustrated in FIG. 4 may be performed by one or more elements of conference system 100. Candidate data centers are identified to host a conference call based on the proximity of the candidate data center to the scheduled participant on the conference call (402). For example, data centers 151-153 may be selected by conference system 100 as candidates to host a conference call with client devices 131-134 (which are scheduled to be on the conference call) based on the geographical locations of data centers 151-153 relative to the geographical locations of client devices 131-134. In another example, data centers 151-153 are selected as candidate data centers based on the locations of data centers 151-153 being within a convex hull (a.k.a. convex envelope) computed from the locations of client devices 131-134.

The candidate data centers are configured to perform synthetic transactions with the scheduled participants on the conference call (404). For example, conferencing system 100 may instruct and/or signal candidate data centers 151-153 to exchange synthetic transactions with client devices 131-134. The synthetic transactions that are exchanged may include, for example, ICMP echo request and reply messages and responses. The synthetic transactions that are exchanged may include, for example, messages of similar type (e.g., real-time protocol—RTP—packets, HTTP packets, etc.), size, and content that will be sent during the conference. The synthetic transactions that are sent may include, for example, predetermined, artificially generated and/or arbitrary content that is carried by the same types of messages that will be sent during the conference.

Based on the synthetic transactions, at least one performance metric associated with communication by each candidate data center with each scheduled participant is determined (406). For example, the performance metrics (e.g., M11, M12, M13, M14, M21, M22, M23, M24, etc.) that are associated with communication between client devices 131-134 and data centers 151-153, as based on the synthetic transactions, may be measured and/or calculated. Based on the performance metrics associated with communication by each candidate data center with each scheduled participant, a centroid for the scheduled participants is determined (408). For example, the link quality performance metrics (e.g., one or more of delay, jitter, packet loss, throughput, error rate, etc., or an algorithmic or mathematical combination thereof) between data centers 151-153 and client devices 131-134 as determined using the synthetic transaction may be used to determine a centroid for client devices 131-134. The centroid for client devices 131-134 may be determined by using the performance metrics to represent distances, locations, and/or weighting factors.

Based on the centroid, a subset of the candidate data centers is selected (410). For example, data centers 151 and 152 may be selected as a priority set to host the conference call based on their proximity to the centroid calculated using the performance metrics between data centers 151-153 and client devices 131-134. The subset of data centers are configured to perform synthetic transactions with scheduled participants on the conference call (412). For example, shortly before the conference call is to begin (or after the conference has begun where there has been a change in network conditions and/or participant on the conference), conference system 100 may instruct and/or signal data centers 151-152 (which are in the priority set) to exchange synthetic transactions with client devices 131-134 (which are scheduled to participate in the conference.)

Based on the performance metrics associated with communication by each of the subset of data centers with each scheduled participant, a data center is selected to host the conference call (414). For example, data center 152 may be selected from the priority set of data centers 151-152 to host the conference call. Data center 152 may be selected over data center 151 based on the performance metrics associated with the priority set of data centers and the scheduled participants (e.g., client device 131-134.)

Figure 5:
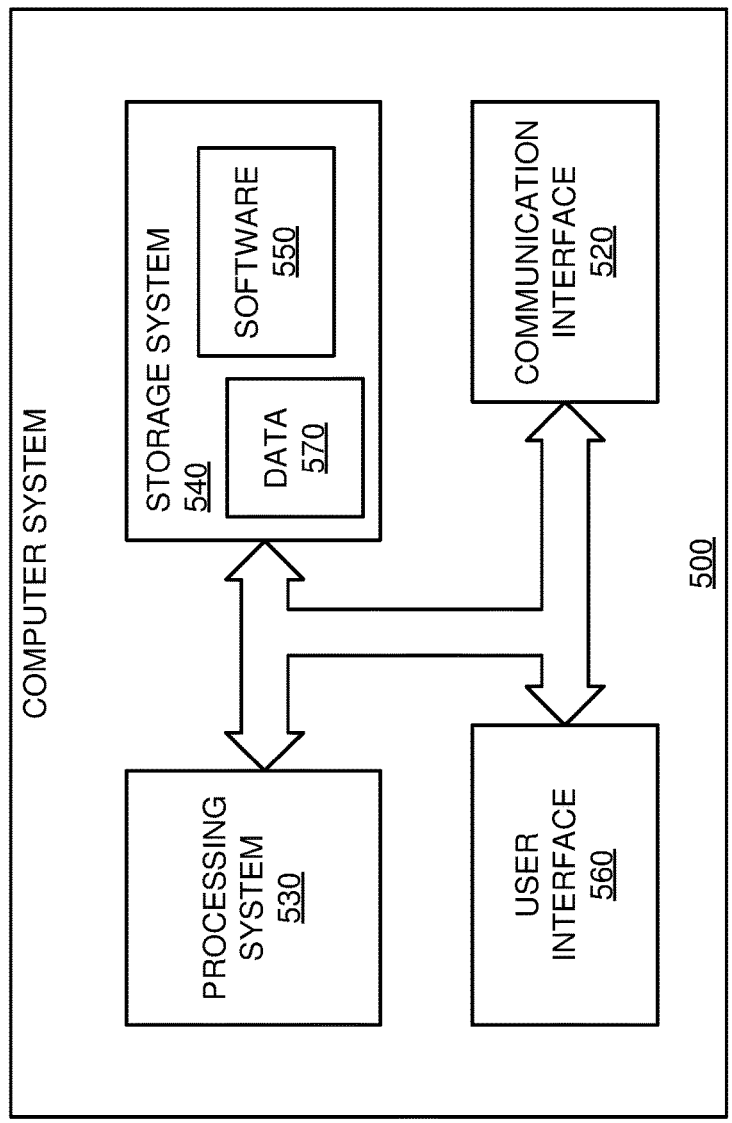
FIG. 5 is a block diagram illustrating a computer system.

FIG. 5 is a block diagram illustrating a computer system. In an embodiment, computer system 500 and/or its components include circuits, software, and/or data that implement, or are used to implement, the methods, systems and/or devices illustrated in the Figures, the corresponding discussions of the Figures, and/or are otherwise taught herein. The methods described above may also be stored on a non-transitory computer readable medium. Devices, circuits, and systems described herein may be implemented using computer-aided design tools available in the art, and embodied by computer-readable files containing software descriptions of such circuits. This includes, but is not limited to one or more elements of conference system 100, and its components. These software descriptions may be: behavioral, register transfer, logic component, transistor, and layout geometry-level descriptions.

Data formats in which such descriptions may be implemented are stored on a non-transitory computer readable medium include, but are not limited to: formats supporting behavioral languages like C, formats supporting register transfer level (RTL) languages like Verilog and VHDL, formats supporting geometry description languages (such as GDSII, GDSIII, GDSIV, CIF, and MEBES), and other suitable formats and languages. Physical files may be implemented on non-transitory machine-readable media such as: 4 mm magnetic tape, 8 mm magnetic tape, 3½-inch floppy media, CDs, DVDs, hard disk drives, solid-state disk drives, solid-state memory, flash drives, and so on.

Alternatively, or in addition, the functionally described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), multi-core processors, graphics processing units (GPUs), etc.

FIG. 5 illustrates a block diagram of an example computer system. Computer system 500 includes communication interface 520, processing system 530, storage system 540, and user interface 560. Processing system 530 is operatively coupled to storage system 540. Storage system 540 stores software 550 and data 570. Processing system 530 is operatively coupled to communication interface 520 and user interface 560. Computer system 500 may comprise a programmed general-purpose computer. Computer system 500 may include a microprocessor. Computer system 500 may comprise programmable or special purpose circuitry. Computer system 500 may be distributed among multiple devices, processors, storage, and/or interfaces that together comprise elements 520-570.

Communication interface 520 may comprise a network interface, modem, port, bus, link, transceiver, or other communication device. Communication interface 520 may be distributed among multiple communication devices. Processing system 530 may comprise a microprocessor, microcontroller, logic circuit, or other processing device. Processing system 530 may be distributed among multiple processing devices. User interface 560 may comprise a keyboard, mouse, voice recognition interface, microphone and speakers, graphical display, touch screen, or other type of user interface device. User interface 560 may be distributed among multiple interface devices. Storage system 540 may comprise a disk, tape, integrated circuit, RAM, ROM, EEPROM, flash memory, network storage, server, or other memory function. Storage system 540 may include computer readable medium. Storage system 540 may be distributed among multiple memory devices.

Processing system 530 retrieves and executes software 550 from storage system 540. Processing system 530 may retrieve and store data 570. Processing system 530 may also retrieve and store data via communication interface 520. Processing system 550 may create or modify software 550 or data 570 to achieve a tangible result. Processing system may control communication interface 520 or user interface 560 to achieve a tangible result. Processing system 530 may retrieve and execute remotely stored software via communication interface 520.

Software 550 and remotely stored software may comprise an operating system, utilities, drivers, networking software, and other software typically executed by a computer system. Software 550 may comprise an application program, applet, firmware, or other form of machine-readable processing instructions typically executed by a computer system. When executed by processing system 530, software 550 or remotely stored software may direct computer system 500 to operate as described herein.

Implementations discussed herein include, but are not limited to, the following examples:

Example 1

A method of selecting a data center to host a conference call, comprising: sending, between a first plurality of participants and a plurality of data centers, synthetic transactions to measure at least one performance metric associated with transmissions between each of the first plurality of participants and each of the plurality of data centers; and, based on the at least one performance metric associated with transmissions between each of the first plurality of participants and each of the plurality of data centers, selecting an initial data center to host a conference call having participants on the conference call that include the first plurality of participants.

Example 2

The method of example 1, further comprising: sending, between at least one of a second plurality of participants and the plurality of data centers, synthetic transactions to measure the at least one performance metric associated with transmissions between each of at least one of the second plurality of participants and each of the plurality of data centers; based on the at least one performance metric associated with transmissions between each of the second plurality of participants and each of the plurality of data centers, identifying a data center to host the conference call having participants on the conference call that include the second plurality of participants; and handing-off the conference call to the identified data center if the data center differs from the initial data center.

Example 3

The method of example 1, wherein the synthetic transactions are sent between the first plurality of participants and the plurality of data centers before the conference call is initiated.

Example 4

The method of example 1, wherein the synthetic transactions are sent between the at least one of a second plurality of participants and the plurality of data centers after the initial data center has begun hosting the conference call.

Example 5

The method of example 1, wherein the at least one performance metric includes a delay associated with the transmissions between each of at least one of the second plurality of participants and each of the plurality of data centers.

Example 6

The method of example 1, wherein the at least one performance metric includes a packet loss associated with the transmissions between each of at least one of the second plurality of participants and each of the plurality of data centers.

Example 7

The method of example 1, further comprising: before the conference call begins, selecting the plurality of data centers from a larger plurality of data centers based on synthetic transactions that measure the at least one performance metric associated with transmissions between each of the first plurality of participants and each of the larger plurality of data centers.

Example 8

A communication system, comprising: an initial data center of a plurality of data centers to initially host a conference call having participants on the conference call that include a first plurality of participants, a selection of the initial data center being based at least in part on performance metrics associated with synthetic transmissions between each of the first plurality of participants and each of a first plurality of data centers of the plurality of data centers; and, a handoff system to select an identified data center from a second plurality of data centers of the plurality of data centers based at least in part on performance metrics associated with synthetic transmissions between each of the first plurality of participants and the identified data center, the identified data center to host the conference call.

Example 9

The communication system of example 8, wherein the selection of the identified data center is based on a first centroid determined from performance metrics associated with synthetic transmissions between each of the first plurality of participants and the first plurality of data centers.

Example 10

The communication system of example 9, wherein the selection of the initial data center is based on a second centroid determined from performance metrics associated synthetic transmissions between each of the first plurality of participants and each of the first plurality of data centers.

Example 11

The communication system of example 10, wherein the first plurality of data centers is selected from the plurality of data centers based on a respective locations associated with each of the first plurality of data centers and respective locations associated with each of the first plurality of data centers.

Example 12

The communication system of example 8, wherein the performance metrics associated with synthetic transmissions between each of the first plurality of participants and the identified data center are based on measured delays associated with transmitting the synthetic transmissions between each of the first plurality of participants and the identified data center.

Example 13

The communication system of example 8, wherein the performance metrics associated with synthetic transmissions between each of the first plurality of participants and the identified data center are based on measured packet losses associated with transmitting the synthetic transmissions between each of the first plurality of participants and the identified data center.

Example 14

The communication system of example 8, wherein the identified data center is selected from the second plurality of data centers before the conference call begins.

Example 15

The communication system of example 8, wherein the identified data center is selected from the second plurality of data centers after the conference call begins.

Example 16

A non-transitory computer readable medium having instructions stored thereon for selecting a data center to host a conference call that, when executed by a computer, at least instruct the computer to: configure a plurality of data centers to send, between a first plurality of participants and the plurality of data centers, synthetic transactions to measure at least one performance metric associated with transmissions between each of the first plurality of participants and each of the plurality of data centers; and, based on the at least one performance metric associated with transmissions between each of the first plurality of participants and each of the plurality of data centers, select an initial data center to host a conference call having participants on the conference call that include the first plurality of participants.

Example 17

The computer readable medium of example 16, wherein the computer is further instructed to: configure the plurality of data centers to send, between at least one of a second plurality of participants and the plurality of data centers, synthetic transactions to measure the at least one performance metric associated with transmissions between each of at least one of the second plurality of participants and each of the plurality of data centers; based on the at least one performance metric associated with transmissions between each of the second plurality of participants and each of the plurality of data centers, identify a data center to host the conference call having participants on the conference call that include the second plurality of participants; and configure the handing-off of the conference call to the identified data center if the data center differs from the initial data center.

Example 18

The computer readable medium of example 16, wherein the synthetic transactions are sent between the first plurality of participants and the plurality of data centers before the conference call is initiated.

Example 19

The computer readable medium of example 16, wherein the synthetic transactions are sent between the at least one of a second plurality of participants and the plurality of data centers after the initial data center has begun hosting the conference call.

Example 20

The computer readable medium of example 16, wherein the at least one performance metric includes a delay and a packet loss rate associated with the transmissions between each of at least one of the second plurality of participants and each of the plurality of data centers.

The foregoing descriptions of the disclosed embodiments have been presented for purposes of illustration and description. They are not intended to be exhaustive or to limit the scope of the claimed subject matter to the precise form(s) disclosed, and other modifications and variations may be possible in light of the above teachings. The embodiments were chosen and described in order to best explain the principles of the disclosed embodiments and their practical application to thereby enable others skilled in the art to best utilize the various embodiments and various modifications as are suited to the particular use contemplated. It is intended that the appended claims be construed to include other alternative embodiments except insofar as limited by the prior art.

What is claimed is:

1. A method of selecting a data processing system to host a communication session, comprising:

sending, between a first plurality of participants and a plurality of data processing systems, synthetic transactions to measure at least one performance metric associated with transmissions between each of the first plurality of participants and each of the plurality of data processing systems; and, based on the at least one performance metric associated with transmissions between each of the first plurality of participants and each of the plurality of data processing systems, selecting an initial data processing system to host a communication session having participants on the communication session that include the first plurality of participants.

2. The method of claim 1, further comprising:

sending, between at least one of a second plurality of participants and the plurality of data processing systems, synthetic transactions to measure the at least one performance metric associated with transmissions between each of at least one of the second plurality of participants and each of the plurality of data processing systems;

based on the at least one performance metric associated with transmissions between each of the second plurality of participants and each of the plurality of data processing systems, identifying a data processing system to host the communication session having participants on the communication session that include the second plurality of participants; and, handing-off the communication session to the identified data processing system if the data processing system differs from the initial data processing system.

3. The method of claim 1, wherein the synthetic transactions are sent between the first plurality of participants and the plurality of data processing systems before the communication session is initiated.

4. The method of claim 1, wherein the synthetic transactions are sent between the at least one of a second plurality of participants and the plurality of data processing systems after the initial data processing system has begun hosting the communication session.

5. The method of claim 1, wherein the at least one performance metric includes a delay associated with the transmissions between each of at least one of the second plurality of participants and each of the plurality of data processing systems or a packet loss associated with the transmissions between each of at least one of the second plurality of participants and each of the plurality of data processing systems.

6. The method of claim 1, wherein the plurality of data processing systems includes one or more data centers.

7. The method of claim 1, further comprising:

before the communication session begins, selecting the plurality of data processing systems from a larger plurality of data processing systems based on synthetic transactions that measure the at least one performance metric associated with transmissions between each of the first plurality of participants and each of the larger plurality of data processing systems.

8. A communication system, comprising:

an initial data processing system of a plurality of data processing systems to initially host a communication session having participants on the communication session that include a first plurality of participants, a selection of the initial data processing system being based at least in part on performance metrics associated with synthetic transmissions between each of the first plurality of participants and each of a first plurality of data processing systems of the plurality of data processing systems; and, a handoff system to select an identified data processing system from a second plurality of data processing systems of the plurality of data processing systems based at least in part on performance metrics associated with synthetic transmissions between each of the first plurality of participants and the identified data processing system, the identified data processing system to host the communication session.

9. The communication system of claim 8, wherein the selection of the identified data processing system is based on a first centroid determined from performance metrics associated with synthetic transmissions between each of the first plurality of participants and the first plurality of data processing systems.

10. The communication system of claim 9, wherein the selection of the initial data processing system is based on a second centroid determined from performance metrics associated synthetic transmissions between each of the first plurality of participants and each of the first plurality of data processing systems.

11. The communication system of claim 10, wherein the first plurality of data processing systems is selected from the plurality of data processing systems based on a respective locations associated with each of the first plurality of data processing systems and respective locations associated with each of the first plurality of data processing systems.

12. The communication system of claim 8, wherein the performance metrics associated with synthetic transmissions between each of the first plurality of participants and the identified data processing system are based on measured delays associated with transmitting the synthetic transmissions between each of the first plurality of participants and the identified data processing system.

13. The communication system of claim 8, wherein the performance metrics associated with synthetic transmissions between each of the first plurality of participants and the identified data processing system are based on measured packet losses associated with transmitting the synthetic transmissions between each of the first plurality of participants and the identified data processing system.

14. The communication system of claim 8, wherein the identified data processing system is selected from the second plurality of data processing systems before the communication session begins.

15. The communication system of claim 8, wherein the identified data processing system is selected from the second plurality of data processing systems after the communication session begins.

16. A non-transitory computer readable medium having instructions stored thereon for selecting a data processing system to host a communication session that, when executed by a computer, at least instruct the computer to:
configure a plurality of data processing systems to send, between a first plurality of participants and the plurality of data processing systems, synthetic transactions to measure at least one performance metric associated with transmissions between each of the first plurality of participants and each of the plurality of data processing systems; and,
based on the at least one performance metric associated with transmissions between each of the first plurality of participants and each of the plurality of data processing systems, select an initial data processing system to host a communication session having participants on the communication session that include the first plurality of participants.

17. The computer readable medium of claim 16, wherein the computer is further instructed to:
configure the plurality of data processing systems to send, between at least one of a second plurality of participants and the plurality of data processing systems, synthetic transactions to measure the at least one performance metric associated with transmissions between each of at least one of the second plurality of participants and each of the plurality of data processing systems;
based on the at least one performance metric associated with transmissions between each of the second plurality of participants and each of the plurality of data processing systems, identify a data processing system to host the communication session having participants on the communication session that include the second plurality of participants; and,
configure the handing-off of the communication session to the identified data processing system if the data processing system differs from the initial data processing system.

18. The computer readable medium of claim 16, wherein the synthetic transactions are sent between the first plurality of participants and the plurality of data processing systems before the communication session is initiated.

19. The computer readable medium of claim 16, wherein the synthetic transactions are sent between the at least one of a second plurality of participants and the plurality of data processing systems after the initial data processing system has begun hosting the communication session.

20. The computer readable medium of claim 16, wherein the at least one performance metric includes a delay and a packet loss rate associated with the transmissions between each of at least one of the second plurality of participants and each of the plurality of data processing systems.

* * * * *